US012283211B2

(12) United States Patent
Wang et al.

(10) Patent No.: US 12,283,211 B2
(45) Date of Patent: Apr. 22, 2025

(54) METHOD AND APPARATUS FOR CONTROLLING DISPLAYING IN DISPLAY PANEL, COMPUTER DEVICE, AND COMPUTER-READABLE MEDIUM

(71) Applicant: Hubei Yangtze Industrial Innovation Center Of Advanced Display Co., Ltd., Wuhan (CN)

(72) Inventors: Yanfeng Wang, Xiamen (CN); Qin Yue, Wuhan (CN); Yangzhao Ma, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

(21) Appl. No.: 18/600,786

(22) Filed: Mar. 11, 2024

(65) Prior Publication Data

US 2024/0221560 A1 Jul. 4, 2024

(30) Foreign Application Priority Data

Aug. 16, 2023 (CN) ......................... 202311037929.7

(51) Int. Cl.
*G09G 3/00* (2006.01)
*G09G 3/20* (2006.01)

(52) U.S. Cl.
CPC ............. *G09G 3/03* (2020.08); *G09G 3/2007* (2013.01); *G09G 2320/0242* (2013.01)

(58) Field of Classification Search
CPC ............................... G09G 3/03; G09G 3/2007
USPC .......................................................... 345/694
See application file for complete search history.

(56) References Cited

U.S. PATENT DOCUMENTS

2020/0035172 A1* 1/2020 Chen ......................... G09G 5/06
2020/0126468 A1* 4/2020 Wang ................... G09G 3/2003

FOREIGN PATENT DOCUMENTS

CN 110223625 A 9/2019
CN 109036271 B 6/2020

* cited by examiner

*Primary Examiner* — Calvin C Ma
(74) *Attorney, Agent, or Firm* — KILPATRICK TOWNSEND & STOCKTON LLP

(57) ABSTRACT

A method and an apparatus for controlling displaying in a display panel. The display panel comprises a planar region and a curved edge region that is divided into multiple curved regions. The method includes: determining, for each curved region, a central pixel among all pixels in said curved region; determining multiple gray-scale combinations; determining chromaticity coordinates of the central pixel of each curved region under each gray-scale combination; determining reference chromaticity coordinates of a target pixel in the planar region under the maximum one of the gray-scale combinations; determining, for each curved region, a target gray-scale combination based on a difference between the reference chromaticity coordinates and the chromaticity coordinates of the central pixel of said curved region under each gray-scale combination; and controlling displaying in each curved region based on the target gray-scale combination of said curved region.

14 Claims, 4 Drawing Sheets

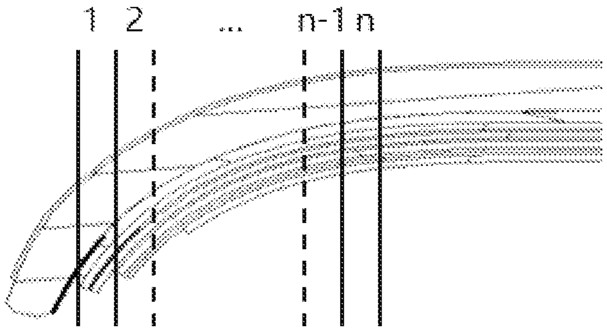

Figure 3

S402

Calculate a JNCD for each gray-scale combination based on the difference between the reference chromaticity coordinates and the chromaticity coordinates of the central pixel of the curved region under such multiple gray-scale combination

↓

S404

Determine a minimum JNCD based on the JNCD for each gray-scale combination, and a gray-scale combination corresponding to the minimum JNCD among the multiple gray-scale combinations is determined to serve as the target gray-scale combination

Figure 4

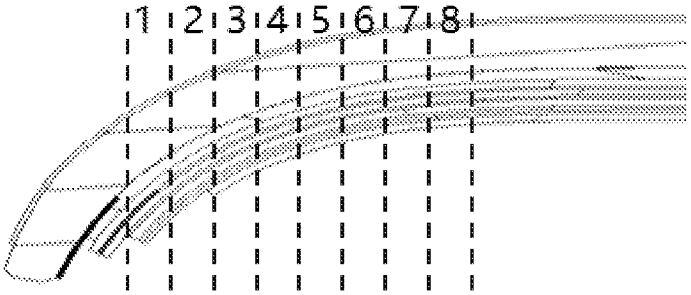

Figure 5

METHOD AND APPARATUS FOR CONTROLLING DISPLAYING IN DISPLAY PANEL, COMPUTER DEVICE, AND COMPUTER-READABLE MEDIUM

The present disclosure claims the priority to Chinese Patent Application No. 202311037929.7, titled "METHOD AND APPARATUS FOR DISPLAYING IN DISPLAY PANEL, DEVICE, MEDIUM, AND PRODUCT", filed on Aug. 16, 2023 with the China National Intellectual Property Administration, the content of which is incorporated herein by reference.

FIELD

The present disclosure relates to the field of display, and in particular to a method and an apparatus for controlling displaying in a display panel, a computer device, a storage medium, and a computer program product.

BACKGROUND

A large screen with a high scree-to-body ratio is always an ultimate pursuit of users. At present, display screens are subject to more than a requirement of being bezel-less. An edge of a bezel-less screen having a glass cover is bent to render a side frame of the screen invisible in a front view.

Conventional techniques are subject to at least a following problem. A large bending angle usually results in a severe color deviation at the edge of the screen, and white color suffers the worst deviation. The color deviation is enlarged with an increase in the bending angle. For example, when the display screen is bent by 90 degrees at the edge, a white picture on the display screen would deviate to be yellow, that is, the image which should have been displayed in white is now displayed in yellow. Hence, an effect of displaying is affected, which reduces user experience greatly.

SUMMARY

A method and an apparatus for controlling displaying in a display panel, a computer device, a computer-readable storage medium, and a computer program product are provided according to embodiments of the present disclosure. Color deviation at a curved edge is suppressed.

In one embodiment, a method for controlling displaying in a display panel is provided according to an embodiment of the present disclosure. The display panel includes a planar region and a curved edge region. The method includes: determining, for each of multiple curved regions, a central pixel among all pixels in said curved region, where the curved edge region is divided into the multiple curved regions; determining multiple gray-scale combinations, determining chromaticity coordinates of the central pixel of each of the multiple curved regions under each of the multiple gray-scale combinations, and determining reference chromaticity coordinates of a target pixel in the planar region under a maximum gray-scale combination among the multiple gray-scale combinations; determining, for each of the multiple curved regions, a target gray-scale combination among the multiple gray-scale combinations based on a difference between the reference chromaticity coordinates and the chromaticity coordinates of the central pixel of said curved region under each of the multiple gray-scale combinations; and controlling displaying in each of the multiple curved regions based on the target gray-scale combination of said curved region.

In one embodiment, an apparatus for controlling displaying in a display panel is further provided according to an embodiment of the present disclosure. The display panel includes: a first determining device, configured to determine, for each of multiple curved regions, a central pixel among all pixels in said curved region, where the curved edge region is divided into the multiple curved regions; a second determining device, configured to determine multiple gray-scale combinations, determine chromaticity coordinates of the central pixel of each of the multiple curved regions under each of the multiple gray-scale combinations, and determine reference chromaticity coordinates of a target pixel in the planar region under a maximum gray-scale combination among the multiple gray-scale combinations; a third determining device, configured to determine, for each of the multiple curved regions, a target gray-scale combination among the multiple gray-scale combinations based on a difference between the reference chromaticity coordinates and the chromaticity coordinates of the central pixel of said curved region under each of the multiple gray-scale combinations; and a displaying device, configured to control displaying in each of the multiple curved regions based on the target gray-scale combination of said curved region.

In one embodiment, a computer device is further provided according to an embodiment of the present disclosure. The computer device includes a memory and a processor. The memory stores a computer program. The processor is configured to execute the computer program to implement any foregoing method in the embodiments.

In one embodiment, a computer-readable storage medium is further provided according to an embodiment of the present disclosure. The computer-readable storage medium stores a computer program, where the computer program when executed by a processor implements any foregoing method in the embodiments.

In one embodiment, a computer program product is further provided according to an embodiment of the present disclosure. The computer program product includes a computer program, where the computer program when executed by a processor implements any foregoing method in the embodiments.

BRIEF DESCRIPTION OF THE DRAWINGS

FIG. 3 is a schematic diagram of dividing a curved edge region according to an embodiment of the present disclosure.

FIG. 4 is a flowchart of a process of determining a target gray-scale combination according to an embodiment of the present disclosure.

FIG. 5 is a schematic diagram of dividing a display panel according to an embodiment of the present disclosure.

DETAILED DESCRIPTION OF EMBODIMENTS

Hereinafter the present disclosure is described in detail in conjunction with the drawings and embodiments, in order to elucidate and clarify the embodiments of the present disclosure. The embodiments described herein are only intended for explaining the present disclosure, not for limiting the present disclosure.

Figure 1:
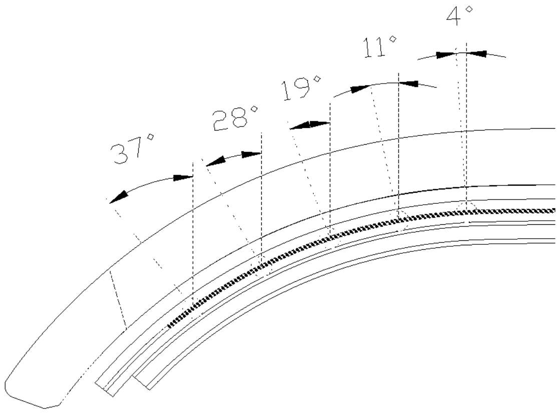
FIG. 1 is a schematic diagram showing a principle of color deviation in a curved edge region according to an embodiment of the present disclosure.

Reference is made to FIG. 1. In conventional technology, a curved screen has a uniform gray scale between a curved edge region and a planar region. When viewing the curved edge region from the front along a direction perpendicular to the planar region, there is color deviation due to an angle between a line of sight and a normal of the curved edge region. Consequently, the curved edge region may be visually subject to red or green deviation.

Figure 2:
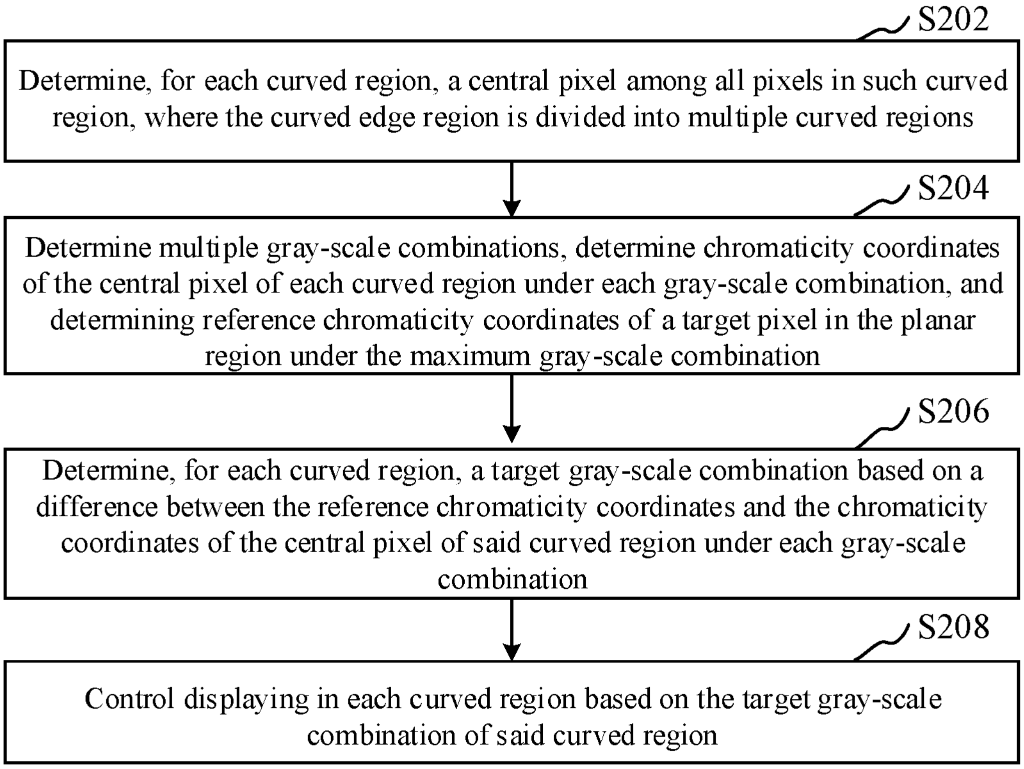
FIG. 2 is a flowchart of a method for controlling displaying in a display panel according to an embodiment of the present disclosure.
Figure 6:
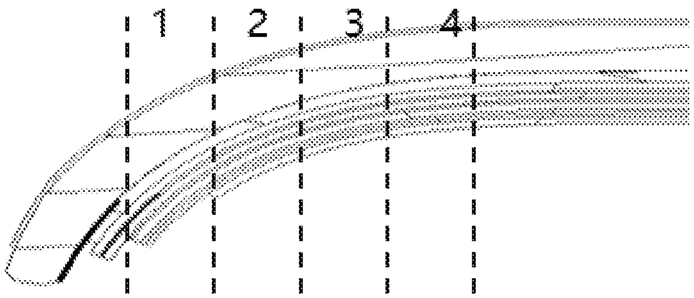
FIG. 6 is a schematic diagram of dividing a display panel according to another embodiment of the present disclosure.

Reference is made to FIG. 2. A method for controlling displaying in a display panel is provided according to an embodiment of the present disclosure, and addresses the issue of color deviation. It is taken as an example that the method is applied to a terminal. It is appreciated that the method may, in one embodiment, be applied to a server, or a system including the terminal and the server. In the latter case, the method is implemented through interaction between the terminal and the server in the system. In this embodiment, the method includes following steps S202 to S208.

In step S202, A central pixel of each curved region is determined among all pixels in such curved region, where a curved edge region is divided into multiple curved regions.

A pixel circuit of the curved edge region is decomposed a matrix defined by rows and columns. An extending direction of the rows is parallel with a junction line between the curved edge region and a planar region, and an extending direction of the columns is perpendicular to extending direction of the row and along a surface of the curved edge region. Each row and each column includes pixels arranged in a line. The pixel circuit is divided into multiple sections, each of which extends along the extending of the rows and includes at least one row of pixels. The sections may be identical or different in a quantity of rows therein, which is not limited herein. Each section serves as a curved region.

In step S204, multiple gray-scale combinations are determined, chromaticity coordinates of the central pixel of each curved region under each gray-scale combination are determined, and reference chromaticity coordinates of a target pixel in the planar region under a maximum gray-scale combination among the multiple gray-scale combinations, is determined.

The target pixel may be a specific pixel in the planar region, for example, a pixel arranged at a center of the planar region. In one embodiment, the target pixel may be an arbitrary pixel within a preset range in the planar region, for example, any pixel in a specific row of pixels in the planar region. The present disclosure is not limited to the above examples. A position of the central pixel of each curved region depends on a position of the target pixel. Each gray-scale combination consists of a gray scale in a red (R) channel, a gray scale in a green (G) channel and a gray scale in a blue (B) channel. The maximum gray-scale combination may refer to the gray-scale combination, in which an average of the gray scale of the R channel, the gray scale of the G channel, and the gray scale of the B channel is the largest among all candidate gray-scale combinations. For example, the multiple gray-scale combinations include all possible gray-scale combinations within a range from $\gamma$-gray-scale combination to 255-gray-scale combination, where $\gamma$ is less than 255. In the $\gamma$-gray-scale combination, the gray scale in each of the three channels is equal to $\gamma$. In the 255-gray-scale combination, the gray scale in each of the three channels is equal to 255. In such case, the maximum gray-scale combination is the 255-gray-scale combination.

The gray-scale combinations can be mapped to chromaticity coordinates and brightness of each pixel. When viewing the display panel from right front, there is a right angle between the line of sight and the surface of the planar region. Therefore, the above mapping relationship is only defined by gray scales of the three channels in each gray-scale combination. For example, the chromaticity coordinates of a pixel in the planer region depend on relative ratio among the gray scale in the R channel, the gray scale in the G channel, and the gray scale in the B channel, and brightness of the pixel may be represented by an average of the gray scales of the three channels. Since a radian of the curved edge region varies at different positions in the curved edge region, the mapping relationship for a pixel in the curved edge region is defined not only by the gray scales of the three channels but also an angle between the line of sight and a normal of the curved edge region. A larger radian results in a larger angle and thus results in a lower brightness of the pixel, and the chromaticity coordinates of the pixel change with the brightness. Therefore, after the gray-scale combination is determined, the chromaticity coordinates and the brightness of each pixel can be determined based on the gray-scale combination and the angle between the line of sight and the normal of the curved edge region.

In step S206, a target gray-scale combination for each curved region is determined among the multiple gray-scale combinations based on a difference between the reference chromaticity coordinates and the chromaticity coordinates of the central pixel of such curved region under each of the multiple gray-scale combinations.

The difference between the chromaticity coordinates of the central pixel and the reference chromaticity coordinates may be represented by an average of differences for corresponding components in the chromaticity coordinates of the central pixel and in the reference chromaticity coordinates. In one embodiment, a variance or a Euclidean distance may be configured to represent the difference. The present disclosure is not limited to the above examples.

A variation in radian is quite small within the same curve region, and hence a difference in chromaticity coordinates among different pixels is also small within the same curve region. Hence, the chromaticity coordinates of the central pixel of the curved region can serve as a representative of chromaticity of the entire curved region.

In step S208, displaying in each of the multiple curved regions is controlled based on the target gray-scale combination of such curved region.

The target gray-scale combination of each curved region is the gray-scale combination corresponding to the smallest foregoing difference, that is, a smallest chromatic difference between the curved region and the planar region. Under such gray-scale combination, color deviation of the curved region is the weakest. Hence, the color deviation of the curved regions can be suppressed to the most extend when their displaying is controlled based on the respective target gray-scale combinations.

In the method provided herein, the target gray-scale combination corresponding to each curved regions are determined among the multiple gray-scale combinations, and displaying in each curved region is controlled based on the respective target gray-scale combination. In one embodiment, color deviation in each curved region can be suppressed, and a degree of the suppression corresponds to a degree of the color deviation, that is, the color deviation is accurately suppressed. The target gray-scale combination of each curved region is determined based on the difference between the chromaticity coordinates of the central pixel of such curved region and the reference chromaticity coordinates. In one embodiment, the degree of color deviation is determined accurately based on the difference, which further improves accuracy of suppressing the color deviation. The chromaticity coordinates of the central pixel of the curved region are selected to represent chromaticity of the entire curved region. In one embodiment, fewer operations are required, which improves efficiency of suppressing the color deviation.

In some embodiments, the curved edge region is divided through a following manner. The curved edge region is divided into the multiple curved regions through multiple planes, and each curved region is located between two adjacent planes among the multiple planes. A plane of the multiple planes meets a preset condition, that is, a normal of the curved edge region, at each position in an intersection line between the plane and the curved edge region, intersects with the plane.

The multiple planes are parallel with each other, and parallel with a junction line between the planar region and the curved edge region. An angle between the plane and the normal may be an arbitrary value, which is not limited herein.

In one embodiment, the multiple planes are determined based on the preset condition, and are utilized to divide the curved edge region into the multiple curved regions. The curved edge region can thus be accurately divided.

In some embodiments, the foregoing intersection is formed under a following condition. Each plane is perpendicular to the planar region, and is parallel with the junction line between the planar region and the curved edge region.

Division of the curved edge region under such condition may refer to FIG. 3. The manner of division as shown in FIG. 3 renders the division simpler and a result of the division more precise.

In some embodiments, pixels in each curved regions are all complete pixels. A width of the curved region is an integral multiple of a width of a single pixel.

Each curved region includes at least one row of pixels, and hence there are multiple complete pixels in each curved region. In addition, the width of the curved region refers to a dimension of the curved region along the extending direction of the columns. Therefore, the width of the curved region is equal to the integral multiple of the width of the single pixel.

Configuring each pixel in the curved regions to be the complete pixel and the width of the curved region to be the integral multiple of the width of the single pixel facilitates subsequent determination of the central pixel in such curved region.

In some embodiments, a quantity of the pixels in each curved region is identical.

In a case that a quantity of the rows of pixels in each curved region is identical and a quantity of the pixels in each row of pixels is identical, the quantity of the pixels in each curved region is identical.

In one embodiment, the same quantity of pixels rows among different curved regions indicates the exact same relative position of the central pixel among the different curved regions. In such case, the subsequently determined difference between the chromaticity coordinates of the central pixel and the reference chromaticity coordinates can serve as a more reliable basis for correcting the color deviation among the different curved regions.

In some embodiments, determining the multiple gray-scale combinations includes following steps. A gray-scale range in each pixel channel is determined. Respective gray scales of all pixel channels are combined according to the gray-scale range in each pixel channel, so as to obtain the multiple gray-scale combinations.

All possible gray scales within the respective gray-scale range may be fetched from each pixel channel to constitute the combinations. In one embodiment, only specific gray scale(s) in the respective gray-scale range of each pixel channel may be selected to constitute the combination. The present disclosure is not limited to the above two cases.

In one embodiment, gray scales in the respective gray-scale ranges of the three pixel channels can be combined in different manners. The gray-scale combination is not only comprehensive but also conformable to an actual requirement.

In some embodiments, the target pixel is located on a central axis of the planar region. The central axis is parallel to the junction line between the planar region and the curved edge region.

The central axis of the planar region may be the middle row of pixels in the planar region, and any pixel on the central axis may be determined as the target pixel.

The target pixel on the central axis of the planar region is more representative in brightness for the entire planar region.

In some embodiments, the central pixel of each curved region is located in a dividing plane of the curved region. The dividing plane is perpendicular to the central axis and passes the target pixel.

After the dividing plane is determined based on the target pixel, a column of pixels located in the dividing plane is determined from each curved region, and a middle pixel in the column of pixels serves as the central pixel of such curved region.

In one embodiment, the central pixel of each curved region is determined based on the target pixel. In such case, the subsequently determined difference between the chromaticity coordinates of the central pixel and the reference chromaticity coordinates can serve as a more reliable basis for correcting the color deviation among the different curved regions.

Reference is made to FIG. 4. In some embodiment, determining the target gray-scale combination for each curved region among the multiple gray-scale combinations based on the difference between the reference chromaticity coordinates and the chromaticity coordinates of the central pixel of such curved region under each gray-scale combination includes following steps S402 and S404, which are performed for each curved region.

In step S402, a just noticeable color difference (JNCD) for each gray-scale combination is calculated based on the difference between the reference chromaticity coordinates and the chromaticity coordinates of the central pixel of the curved region under such multiple gray-scale combination.

The JNCD is measurement of a minimum color difference perceivable by human eyes, and can evaluate distinguishability among different colors. The JNCD is calculated based on a difference between a component in the chromaticity coordinates of the central pixel of the curved region and a corresponding component in the reference chromaticity coordinates. The JNCD may be calculated according to following equation (1).

$$JNCD^{m}_{(i,j,k)} = \frac{\sqrt{\left(u' - u'^{m}_{(i,j,k)}\right)^2 + \left(v' - v'^{m}_{(i,j,k)}\right)^2}}{0.004} \tag{1}$$

In equation (1), m represents a sequential number of the curved region. i represents a gray scale of the R channel of the central pixel of the curved region, j represents a gray scale of the G channel of the central pixel of the curved region, and k represents a gray scale of the B channel of the central pixel of the curved region. ($u'_{(i,\ j,\ k)}{}^{m}$, $v'_{(i,\ j,\ k)}{}^{m}$) represents chromaticity coordinates of the central pixel of the curved region, and (u', v') represents the reference color coordinate of the target pixel of the planar region. $JNCD_{(i,\ j,\ k)}{}^{m}$ represents the JNCD of the curved region, of which the sequential number is m, under the gray-scale combination (i, j, k).

In step S404, a minimum JNCD is determined based on the JNCD for each of the multiple gray-scale combinations, and a gray-scale combination corresponding to the minimum JNCD among the multiple gray-scale combinations is determined to serve as the target gray-scale combination.

The JNCD reflects a degree of the color deviation in the curved edge region. A small JNCD indicates week color deviation. The JDCDs under all gray-scale combinations, respectively, are calculated for each curved region according to equation (1). The gray-scale combination corresponding to the minimum JNCD is an optimal gray-scale combination under which the color deviation in the curved region is the weakest. For example, the multiple gray-scale combinations includes all possible gray-scale combinations ranging from the γ-gray-scale combination to the 255-gray-scale combination. In such case, the minimum JNCD for determining the target gray-scale combination of the curved region, of which the sequential number is m, may be expressed as following equation (2).

$$JNCD^{m}_{min} = \min\left(JNCD^{m}_{(\gamma,\gamma,\gamma)}, JNCD^{m}_{(\gamma+1,\gamma,\gamma)}, \dots, JNCD^{m}_{(255,\gamma,\gamma)}, JNCD^{m}_{(\gamma,\gamma+1,\gamma)}, \dots, JNCD^{m}_{(255,\gamma+1,\gamma)}, \dots, JNCD^{m}_{(255,255,255)}\right) \tag{2}$$

In one embodiment, the target gray-scale combination corresponding to the minimum JNCD is determined as the optimal gray-scale combination for each curved region, and displaying in each curved region is controlled according to the respective optimal gray-scale combination. The color deviation of each curved region can be suppressed to the most extent.

In some embodiments, determining the chromaticity coordinates of the central pixel of each curved region under each gray-scale combination includes following steps for each curved region under each gray-scale combination. Initial chromaticity coordinates of the central pixel of such curved region in an initial color space based on chromaticity coordinates and brightness of each of pixel channels under such gray-scale combination. The initial chromaticity coordinates of the central pixel of such curved region is converted into target chromaticity coordinates of the central pixel of such curved region in a target color space. The target chromaticity coordinates of the central pixel of such curved region serves as the chromaticity coordinates of the central pixel of such curved region under such gray-scale combination.

The color space is a means of describing and characterizing a color with a mathematical model, in which a coordinate system and color components are defined. The color space may be expressed in multiple forms. Herein the RGB color space is adopted, while another color space is applicable to other embodiments. A form of the color space is not limited herein.

The initial color space is more concise, and has higher consistency in measurement of colors. Hence, respective chromaticity coordinates and respective brightness in each pixel channel are adapted to the initial color space to calculate the initial chromaticity coordinates of the central pixel. Chromaticity coordinates in the target color space are more stable and comparable than chromaticity coordinates in the initial color space. Hence, the initial chromaticity coordinates needs to be transformed into the target chromaticity coordinates. For example, the initial color space may be the CIE1931, and the target color space may be the CIE1976. Both the CIE1931 and the CIE1976 belong to RGB color spaces. The initial chromaticity coordinates in the CIE1931 may be calculated according to following equations (3) and (4)

$$W^{m}_{x_{(i,j,k)}} = \frac{R_{x,i}R_{Y,i}/R_{y,i} + G_{x,j}G_{Y,j}/G_{y,j} + B_{x,k}B_{Y,k}/B_{y,k}}{R_{Y,i}/R_{y,i} + G_{Y,j}/G_{y,j} + B_{Y,k}/B_{y,k}} \tag{3}$$

$$W^{m}_{y_{(i,j,k)}} = \frac{R_{Y,i} + G_{Y,j} = B_{Y,k}}{R_{Y,i}/R_{y,i} + G_{Y,j}/G_{y,j} + B_{Y,k}/B_{y,k}} \tag{4}$$

($W_{x(i,\ j,\ k)}{}^{m}$, $W_{y(i,\ j,\ k)}{}^{m}$) represents the initial chromaticity coordinates of the central pixel of the curved region of which the sequential number is m (hereinafter referred as curved region m) in the CIE1931 under the gray-scale combination (i,j,k). ($R_{x,\ i}$, $R_{y,\ i}$) represents chromaticity coordinates corresponding to the R channel of the central pixel of the curved region m, $R_{Y,\ i}$ represents brightness corresponding to the R channel of the central pixel of the curved region m, ($G_{x,\ j}$, $G_{y,\ j}$) represents chromaticity coordinates corresponding to the G channel of the central pixel of the curved region m, $G_{Y,\ j}$ represents brightness corresponding to the G channel of the central pixel of the curved region m, ($B_{x,\ k}$, $B_{y,\ k}$) represents chromaticity coordinates corresponding to the B channel of the central pixel of the curved region m, and $B_{Y,\ k}$ represents brightness corresponding to the B channel of the central pixel of the curved region m.

The initial chromaticity coordinates in the CIE1931 may be transformed into the target chromaticity coordinates in the CIE1976 according to following equations (5) and (6).

$$u'^{m}_{(i,j,k)} = \frac{4W^{m}_{x_{(i,j,k)}}}{-2W^{m}_{x_{(i,j,k)}} + 13W^{m}_{y_{(i,j,k)}} + 3} \tag{5}$$

$$v'^{m}_{(i,j,k)} = \frac{9W^{m}_{y_{(i,j,k)}}}{-2W^{m}_{x_{(i,j,k)}} + 13W^{m}_{y_{(i,j,k)}} + 3} \tag{6}$$

($u'_{(i,\ j,\ k)}{}^{m}$, $v'_{(i,\ j,\ k)}{}^{m}$) represents the target chromaticity coordinates, of the central pixel of the curved region m in the CIE1976 under the gray-scale combination (i,j,k).

In one embodiment, the respective chromaticity coordinates and the respective brightness of each pixel channel are adapted to the initial color space, which ensures accuracy of the obtained initial chromaticity coordinates and simplifies the computation. The initial chromaticity coordinates are then transformed into the target chromaticity coordinates in the target color space, which improves stability and comparability of the final chromaticity coordinates.

In some embodiments, determining the reference chromaticity coordinates of the target pixel in the planar region under the maximum gray-scale combination among the multiple gray-scale combinations includes following steps. Initial chromaticity coordinates of the target pixel in the initial color space is calculated based on chromaticity coordinates and brightness of each pixel channel under the maximum gray-scale combination. The initial chromaticity coordinates of the target pixel is transformed into target chromaticity coordinates of the target pixel in the target color space. The target chromaticity coordinates of the target pixel serve as the reference chromaticity coordinates.

The initial chromaticity coordinates of the target pixel in the CIE1931 may be calculated according to following equations (7) and (8).

$$W_x = \frac{R_x R_Y/R_y + G_x G_Y/G_y + B_x B_Y/B_y}{R_Y/R_y + G_Y/G_y + B_Y/B_y} \tag{7}$$

$$W_y = \frac{R_Y + G_Y + B_Y}{R_Y/R_y + G_Y/G_y + B_Y/B_y} \tag{8}$$

($W_x$, $W_y$) represents the initial chromaticity coordinates of the target pixel in the CIE1931. ($R_x$, $R_y$) represents chromaticity coordinates corresponding to the R channel of the target pixel, $R_Y$ represents brightness corresponding to the R channel of the target pixel, ($G_x$, $G_y$) represents chromaticity coordinates corresponding to the G channel of the target pixel, $G_Y$ represents brightness corresponding to the G channel of the target pixel, ($B_x$, $B_y$) represents chromaticity coordinates corresponding to the B channel of the target pixel, and $B_Y$ represents brightness corresponding to the B channel of the target pixel.

The initial chromaticity coordinates of the target pixel in CIE1931 may be transformed into the target chromaticity coordinates of the target pixel in the CIE1976 according to following equations (9) and (10).

$$u' = \frac{4W_x}{-2W_x + 13W_y + 3} \tag{9}$$

-continued $$v' = \frac{9W_y}{-2W_x + 13W_y + 3} \tag{10}$$

(u', v') represents the target chromaticity coordinates of the target pixel in the CIE1976.

In one embodiment, the initial chromaticity coordinates calculated in the CIE1931 are transformed into the target chromaticity coordinates in the CIE1976, which provides a basis for subsequent calculation of respective JNCDs of each curved region.

Hereinafter an example of the method provided herein is illustrated.

Reference is made to FIG. 5. Five display panels of a first model are acquired, and their serial numbers are denoted as #1, #6, #7, #8, and #16, respectively. The curved edge region of each display panel is equally divided into eight curved regions, and the curved region 1 and the curved region 2 of the eight curved regions are combined as one target region. A range of the multiple gray-scale combinations is from the 250-gray-scale combination to the 255-gray-scale combination 255. For each of the five display panels, the respective chromaticity coordinates and the respective brightness of each pixel channel are measured at a central pixel of the planar region under the 255-gray-scale combination. In one embodiment, for each of the five display panels, the respective chromaticity coordinates and the respective brightness of each pixel channel are measured at the central pixel of the target region under each gray-scale combination within the range. When each display panel is at peak brightness during normal operation, the JNCDs are measured and the brightness is calculated for the target region of each display panel under the 255-gray-scale combination. Afterwards, on a basis of the foregoing calculation, the gray-scale combinations for the target regions of the display panels #1, #6, #7, #8, and #16 are adjusted to be (255, 254, 250), (255, 253, 250), (255, 253, 250), (255, 252, 250), and (255, 254, 250), respectively. After the adjustment, the respective JNCD and the respective brightness of the target region of each display panel is calculated or measured again.

Table 1 shows data before and after the adjustment. The data in Table 1 indicates that the JNCD of the target region of each display panel decreases by approximately 0.8 through the adjustment. That is, the color deviation of the curved region can be effectively suppressed with the method provided herein. In addition, the brightness of the target region of each display panel decreases by only approximately 5 nit after the adjustment. That is, the adjustment has little impact on the brightness. Comprehensive consideration of both the JNCD and the brightness indicates that the gray-scale combination (255, 253, 250) may be optimal.

TABLE 1

| | Before adjustment | | | After adjustment | | |
|---|---|---|---|---|---|---|
| Serial number | Gray-scale combination R:G:B | JNCD | Brightness (nit) | Gray-scale combination R:G:B | JNCD | Brightness (nit) |
| #1 | 255:255:255 | 3.54 | 313.1 | 255:254:250 | 2.68 | 309.5 |
| #6 | 255:255:255 | 3.65 | 319.8 | 255:253:250 | 2.95 | 315.2 |
| #7 | 255:255:255 | 4.46 | 313.0 | 255:253:250 | 3.68 | 307.8 |
| #8 | 255:255:255 | 2.67 | 317.8 | 255:252:250 | 2.00 | 310.5 |
| #16 | 255:255:255 | 3.45 | 327.4 | 255:254:250 | 2.50 | 326.6 |

Five other display panels of the first model are further acquired, and their serial numbers are denoted as #46, #64, #68, #81, and #90, respectively. The curved edge region of each display panel is equally divided into eight curved regions, and the first curved region 1 and the second curved region 2 of the eight curved regions are combined as one target region. For each of the five display panels, under the 255-gray-scale combination, the respective chromaticity coordinates and the respective brightness of each pixel channel are measured at the central pixel of the planar region and at the central pixel of the target region. Accordingly, when each display panel is at peak brightness during normal operation, the JNCDs are measured and the brightness is calculated for the target region of each display panel under the 255-gray-scale combination. Then, the gray-scale combinations for the target regions of the display panels are all adjusted to be (255, 253, 250). After the adjustment, the respective chromaticity coordinates and the respective brightness of each pixel channel are measured again at the central pixel of the planar region and at the central pixel of the target region for each display panel. Accordingly, when each display panel is at peak brightness during normal operation, the JNCDs are measured and the brightness is calculated for the target region of each display panel under the gray-scale combination (255, 253, 250).

Table 2 shows data before and after the adjustment. The data in Table 2 indicates that the JNCD of the target region of each display panel decreases by approximately 0.8 through the adjustment, which is consistent with what is expected from the previous gray-scale calculation. In addition, a decrease of the brightness of the target region of each display panel due to the adjustment in gray-scale is approximately 10 nit, which is a bit higher than what is expected while still acceptable. Hence, the method provided herein is capable to suppress the color deviation in the curved edge region effectively.

TABLE 2

| Serial number | JNCD Before adjustment | JNCD After adjustment | Brightness (nit) Before adjustment | Brightness (nit) After adjustment |
|---|---|---|---|---|
| #46 | 3.36 | 2.75 | 306.5 | 296.5 |
| #64 | 4.52 | 3.67 | 315.8 | 308.7 |
| #68 | 4.40 | 3.57 | 300.9 | 288.7 |
| #81 | 4.32 | 3.49 | 298.6 | 287.5 |
| #90 | 5.14 | 4.32 | 316.1 | 305.2 |

Hereinafter an example of the method provided herein is illustrated.

Reference is made to FIG. 5. Six display panels of a second model are acquired, and their serial numbers are denoted as #1, #2, #3, #4, #5, and #6, respectively. The curved edge region of each display panel is equally divided into four curved regions. A range of the multiple gray-scale combinations is from the 250-gray-scale combination to the 255-gray-scale combination 255. For each of the six display panels, the respective chromaticity coordinates and the respective brightness of each pixel channel are measured at a central pixel of the planar region under the 255-gray-scale combination. In one embodiment, for each of the six display panels, the respective chromaticity coordinates and the respective brightness of each pixel channel are measured at the central pixel of the curved region 1 under each gray-scale combination within the range. Accordingly, when each display panel is at peak brightness during normal operation, the JNCDs are measured and the brightness is calculated for the curved region 1 of each display panel under all gray-scale combinations. As a result, the gray-scale combinations for the curved region is of the display panels #1 to #6 are adjusted to be (255, 250, 252), (255, 251, 252), (255, 251, 252), (255, 251, 252), (255, 250, 252), and (255, 251, 252), respectively. After the adjustment, the respective JNCD and the respective brightness of the curved region 1 of each display panel is calculated or measured.

Table 3 shows data before and after the adjustment. The data in Table 1 indicates that the gray-scale combination (255, 251, 252) may be optimal. The JNCD of the curved region 1 of each of the display panels #2, #3, #4, and #6 decreases by approximately 0.6 through the adjustment. That is, the color deviation of the curved region can be effectively suppressed with the method provided herein.

TABLE 3

| Serial number | Before adjustment Gray-scale combination R:G:B | Before adjustment JNCD | After adjustment Gray-scale combination R:G:B | After adjustment JNCD |
|---|---|---|---|---|
| #1 | 255:255:255 | 3.18 | 255:250:252 | 2.55 |
| #2 | 255:255:255 | 4.12 | 255:251:252 | 3.69 |
| #3 | 255:255:255 | 5.86 | 255:251:252 | 5.21 |
| #4 | 255:255:255 | 2.63 | 255:251:252 | 2.11 |
| #5 | 255:255:255 | 3.56 | 255:250:252 | 2.98 |
| #6 | 255:255:255 | 4.55 | 255:251:252 | 3.91 |

Five other display panels of the second model are further acquired. The curved edge region of each display panel is equally divided into four curved regions. The JNCD of the curved region 1 of each display panel is calculated through measurement under the 255-gray-scale combination, just as the above case. Then, the gray-scale combinations of the curved regions 1 of these five display panels are all adjusted to be (255, 251, 252), and afterwards the respective JNCD of the curved region 1 of each display panel is again calculated through measurement.

Table 4 shows data before and after the adjustment. The data in Table 4 indicates that the JNCD of the curved region 1 of each display panel decreases by approximately 0.55 through the adjustment, which is consistent with what is expected from the previous gray-scale calculation.

TABLE 4

| Serial number | JNCD Before adjustment | JNCD After adjustment |
|---|---|---|
| #10 | 3.51 | 3.02 |
| #11 | 2.66 | 2.12 |
| #12 | 2.87 | 2.29 |
| #13 | 3.44 | 3.02 |
| #14 | 3.65 | 3.06 |

Figure 7:
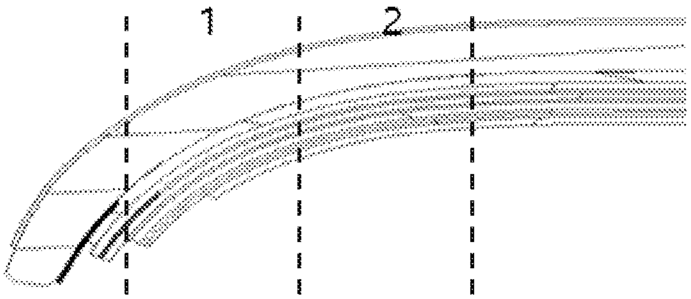
FIG. 7 is a schematic diagram of dividing a display panel according to another embodiment of the present disclosure.

Reference is made to FIG. 7. In order to determine an influence of the width of the curved region on the JNCD, the curved edge region of each of the display panels #1, #2, #3, #4, #5, and #6 is equally divided into two curved regions. Similar to the above cases, the JNCD of the curved region 1 of each display panel is calculated under the 255-gray-scale combination. Then, the gray-scale combinations of the display panels #1 to #6 is adjusted to be (255, 252, 254), (255, 252, 253), (255, 252, 251), (255, 253, 253), (255, 252, 253), and (255, 253, 253), respectively. After the adjustment, the respective JNCD of the curved regions 1 of each display panel subjected is calculated again.

Table 5 shows data before and after the adjustment. The data in Table 5 indicates that the gray-scale combination (255, 252, 253) may be optimal. The JNCD of the curved region 1 of each of the corresponding display panels #2 and #5 decreases by approximately 0.4 through the adjustment.

TABLE 5

| | Before adjustment | | After adjustment | |
|---|---|---|---|---|
| Serial number | Gray-scale combination R:G:B | JNCD | Gray-scale combination R:G:B | JNCD |
| #1 | 255:255:255 | 3.18 | 255:252:254 | 2.67 |
| #2 | 255:255:255 | 4.12 | 255:252:253 | 3.88 |
| #3 | 255:255:255 | 5.86 | 255:251:252 | 5.54 |
| #4 | 255:255:255 | 2.63 | 255:253:253 | 2.32 |
| #5 | 255:255:255 | 3.56 | 255:252:253 | 3.01 |
| #6 | 255:255:255 | 4.55 | 255:253:253 | 4.11 |

Five other display panels of the second model are further acquired. The curved edge region of each display panel is equally divided into two curved regions. The JNCD of the curved region 1 of each display panel is calculated through measurement under the 255-gray-scale combination, which is similar to the above case. Then, the gray-scale combinations of the curved regions 1 of these five display panels are all adjusted to be (255, 252, 253), and afterwards the respective JNCD of the curved region 1 of each display panel is again calculated through measurement.

Table 6 shows data before and after the adjustment. The data in Table 6 indicates that the JNCD of the curved region 1 of each display panel decreases by approximately 0.31 through the adjustment, which is consistent with what is expected from the previous gray-scale calculation.

TABLE 6

| Serial | JNCD | |
|---|---|---|
| number | Before adjustment | After adjustment |
| #10 | 3.51 | 3.21 |
| #11 | 2.66 | 2.23 |
| #12 | 2.87 | 2.48 |
| #13 | 3.44 | 3.26 |
| #14 | 3.65 | 3.41 |

The case of dividing the curved edge region into four curved regions is compared with the case of dividing the curved edge region into two curved regions. It can be seen that the JNCD of the curved region 1 decreases more through the adjustment in the former case. Thus, the larger the quantity of the curved regions into which the curved edge region is divided, i.e., the smaller the width of each curved region is, the better the color deviation is suppressed.

Hereinafter another example of the method provided herein is illustrated.

Figure 8:
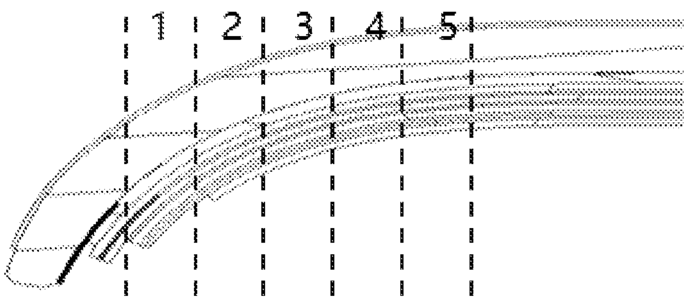
FIG. 8 is a schematic diagram of dividing a display panel according to another embodiment of the present disclosure.

Reference is made to FIG. 8. Four display panels of a third model are acquired, and their serial numbers are denoted as #1, #2, #3, and #4, respectively. The curved edge region of each display panel is equally divided into five curved regions. Similar to the above cases, the JNCD of the curved region 1 and the curved region 2 of each display panel is adjusted, and date of the curved region 1 and the curved region 2 before and after the adjustment are illustrated in Table 7. Table 7 indicates that the gray-scale combination (255, 252, 253) is optimal for the curved region 1, and the gray-scale combination (255, 254, 253) is optimal for the curved region 2. A degree of the color deviation of the curved regions is significantly reduced through the adjustment. In each of the display panel, the JNCD of the curved region 1 decreases by approximately 0.3 and the JNCD of the curved region 2 decreases by approximately 0.65. Four other display panels of the third model are further acquired. For each of these four display panels, the gray-scale combination of the curved region 1 is adjusted to be (255, 252, 253), and the gray-scale combination of the curved region 2 is adjusted to be (255, 254, 253). Table 8 illustrates data of the curved regions 1 and the curved regions 2 before and after the adjustment in these four display panels. Table 8 indicates that through the adjustment, the JNCD of the curved region 1 decreases by approximately 0.2 and the JNCD of the curved region 2 decreases by approximately 0.32, which is consistent with what is expected from the previous gray-scale calculation.

TABLE 7

| | Curved region 1 | | | | Curved region 2 | | | |
|---|---|---|---|---|---|---|---|---|
| | Before adjustment | | After adjustment | | Before adjustment | | After adjustment | |
| Serial number | Gray-scale combination R:G:B | JNCD | Gray-scale combination R:G:B | JNCD | Gray-scale combination R:G:B | JNCD | Gray-scale combination R:G:B | JNCD |
| #1 | 255:255:255 | 2.35 | 255:250:251 | 2.13 | 255:255:255 | 1.66 | 255:254:253 | 1.01 |
| #2 | 255:255:255 | 2.65 | 255:252:253 | 2.33 | 255:255:255 | 2.00 | 255:252:253 | 1.41 |
| #3 | 255:255:255 | 2.54 | 255:254:253 | 2.35 | 255:255:255 | 1.98 | 255:250:251 | 1.41 |
| #4 | 255:255:255 | 2.49 | 255:251:252 | 2.24 | 255:255:255 | 1.87 | 255:251:252 | 1.39 |

TABLE 8

| | JNCD of curved region 1 | | JNCD of curved region 2 | |
|---|---|---|---|---|
| Serial number | Before adjustment | After adjustment | Before adjustment | After adjustment |
| #6 | 2.55 | 2.41 | 1.66 | 1.33 |
| #7 | 2.68 | 2.48 | 1.78 | 1.47 |
| #9 | 2.31 | 2.18 | 1.46 | 1.06 |
| #10 | 2.59 | 2.35 | 1.89 | 1.64 |

Although steps in the flowcharts of the foregoing embodiments are depicted in a sequence indicated by arrows, it may be not necessary to execute the steps strictly according to such sequence. Unless otherwise explicitly specified herein, a sequence of executing the steps is not strictly limited, and the steps may be implemented in another sequence. In addition, at least one step in these flowcharts may include multiple sub-steps or multiple stages. It may be not necessary to execute the sub-steps or the stages simultaneously. Rather, the sub-steps or the stages may be executed at different time instants. In one embodiment, it may be not necessary to execute the sub-steps or the stages sequentially. Rather, the sub-steps or the stages may be implemented alternately along with at least some sub-steps or stages of another step.

Based on the same concept, an apparatus for controlling displaying in a display panel is further provided according to an embodiment of the present disclosure. The apparatus is configured to implement the method in any foregoing embodiment. The apparatus and the method are subject to similar solution. Hence, details of following apparatus embodiments may refer to those of the foregoing method embodiments, and are not repeated herein.

Figure 9:
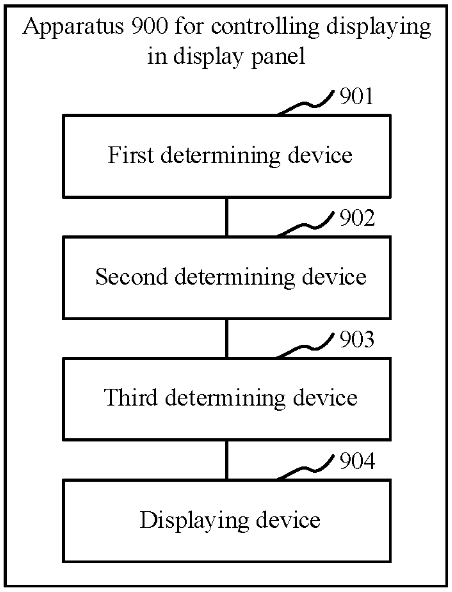
FIG. 9 is a schematic structural diagram of an apparatus for controlling displaying in a display panel according to another embodiment of the present disclosure.

Reference is made to FIG. 9. In an embodiment, the apparatus 900 for controlling displaying in a display panel includes a first determining device 901, a second determining device 902, a third determining device 903, and a displaying device 904.

The first determining device 901 is configured to determine, for each of multiple curved regions, a central pixel among all pixels in said curved region, where the curved edge region is divided into the multiple curved regions.

The second determining device 902 is configured to: determine multiple gray-scale combinations; determine chromaticity coordinates of the central pixel of each curved region under each gray-scale combination; and determine reference chromaticity coordinates of a target pixel in the planar region under a maximum gray-scale combination among the multiple gray-scale combinations.

The third determining device 903 is configured to determine, for each curved region, a target gray-scale combination among the multiple gray-scale combinations based on a difference between the reference chromaticity coordinates and the chromaticity coordinates of the central pixel of said curved region under each gray-scale combination.

The displaying device 904 is configured to control displaying in each curved region based on the target gray-scale combination of said curved region.

In some embodiments, the apparatus 900 further includes: a dividing device, configured to divide the curved edge region into the multiple curved regions through multiple planes that are parallel, where: each of the multiple curved region is located between two adjacent planes among the multiple planes; and a normal of the curved edge region, at each position in an intersection line between a plane of the multiple planes and the curved edge region, intersects with the plane.

In some embodiments, each of the multiple planes is perpendicular to the planar region, and is parallel with a junction line between the planar region and the curved edge region.

In some embodiments, each pixel in each curved region is a complete pixel, and a width of each curved region is equal to an integral multiple of a width of a single pixel.

In some embodiments, a quantity of pixels in each curved region is identical.

In some embodiments, the second determining device 902 is further configured to: determining a gray-scale range in each of pixel channels; and combine respective gray scales of all pixel channels according to the gray-scale range in each of the pixel channels to obtain the multiple gray-scale combinations.

In some embodiments, the target pixel is located on a central axis of the planar region, and the central axis is parallel with a junction line between the planar region and the curved edge region.

In some embodiments, the central pixel of each curved region located in a dividing plane, and the dividing plane is perpendicular to the central axis and passes the target pixel.

In some embodiments, the third determining device 903 is further configured to, for each curved region: calculate a JNCD for each gray-scale combination based on the difference between the reference chromaticity coordinates and the chromaticity coordinates of the central pixel of said curved region under said gray-scale combination; determine a minimum JNCD based on the JNCD for each gray-scale combination; and determining a gray-scale combination corresponding to the minimum JNCD among the multiple gray-scale combinations to serve as the target gray-scale combination.

In some embodiments, the second determining device 902 is further configured to, for each of the curved regions under each gray-scale combination: calculate initial chromaticity coordinates of the central pixel of said curved region in an initial color space based on chromaticity coordinates and brightness of each of pixel channels under said gray-scale combination; and transform the initial chromaticity coordinates of the central pixel of said curved region into target chromaticity coordinates of the central pixel of said curved region in a target color space, where the target chromaticity coordinates of the central pixel of said curved region serve as the chromaticity coordinates of the central pixel of said curved region under said gray-scale combination.

In some embodiments, the second determining device 902 is further configured to: calculate initial chromaticity coordinates of the target pixel in the initial color space based on chromaticity coordinates and brightness of each of pixel channels under the maximum gray-scale combination; and transform the initial chromaticity coordinates of the target pixel into target chromaticity coordinates of the target pixel in the target color space, where the target chromaticity coordinates of the target pixel serve as the reference chromaticity coordinates.

The foregoing devices in the apparatus may be entirely or partially implemented through software, hardware, or a combination thereof. The foregoing device may be built in, or independent from, a processor in a computer device in a hardware form. In one embodiment, the foregoing device may be stored in a memory in a computer device in a software form, and a processor may invoke such device and perform an operation corresponding to such device.

Figure 10:
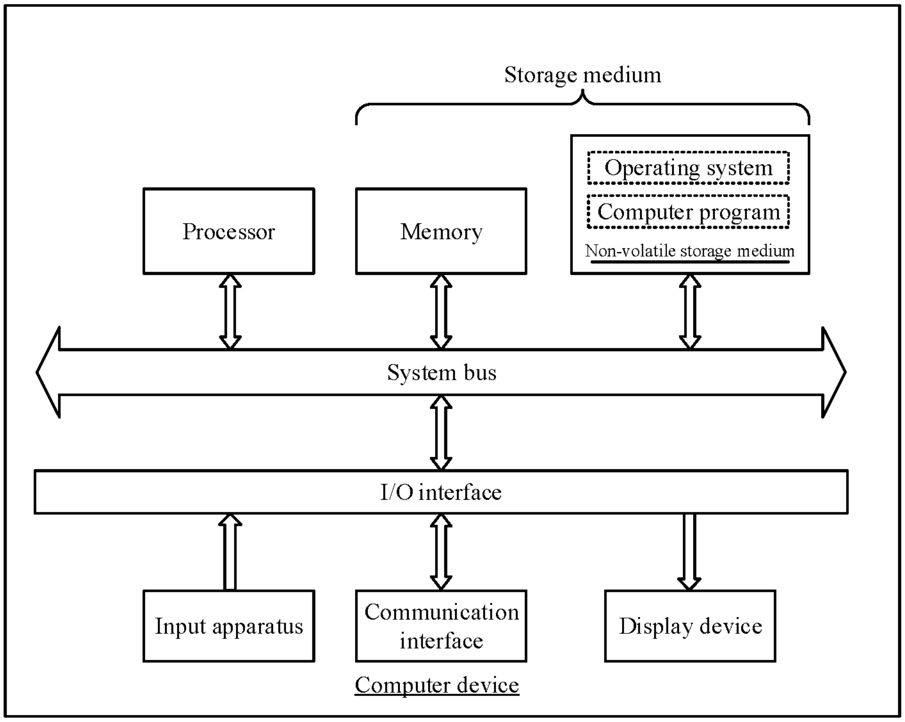
FIG. 10 is a schematic diagram of an internal structure of a computer device another embodiment of the present disclosure.

A computer device is further provided according to an embodiment of the present disclosure. The computer device may be a terminal, and an internal structure of the terminal may be as shown in FIG. 10. The computer device includes a processor, a memory, an input/output interface, a communication interface, a display device, and an input apparatus. The processor, the memory, and the input/output interface are connected via a bus. The communication interface, the display device and the input apparatus are connected to the bus via the input/output interface. The processor of the computer device is configured to provide computing and control functions. The memory of the computer device includes a non-volatile storage medium and an internal memory. The non-volatile storage medium is configured to store an operating system and a computer program. The internal memory is configured to provide an environment for running the operating system and the computer program in the non-volatile storage medium. The input/output interface of the computer device is configured to implement information exchange between the processor and an external device. The communication interface of the computer device is configured to communicate with an external terminal in a wired or wireless manner. The wireless communication may be implemented through Wi-Fi, a mobile cellular network, near field communication (NFC), or other techniques. The computer program when executed by a processor implements the method for controlling displaying in the display panel. A display device of the computer device is configured to present a visible image, and may be a display screen, a projector, or a virtual-reality imaging apparatus. The display screen may be a liquid crystal display screen or an electronic ink display screen. The input apparatus of the computer device may be a touch-control layer covering the display screen. In one embodiment, the input apparatus may be a key, a trackball, or a touchpad, which is installed at housing of the computer device. In one embodiment, the input apparatus may be a keyboard, a touchpad, a mouse, or the like, which is connected to the computer device.

The structure as shown in FIG. 10 is only a block diagram of a part of a structure associated with solutions of the present disclosure, and does not constitute a limitation to a computer device to which the solutions of the present disclosure is applicable. The computer device may include more or fewer components than the components shown in the drawings, may include a combination of a part of the components, or may include the components arranged in a different manner.

In an embodiment, a computer device is further provided. The computer device includes a memory and a processor. The memory stores a computer program. The computer program when executed by the processor implements the method in any foregoing embodiments.

In an embodiment, a computer-readable storage medium is further provided. The computer-readable storage medium stores a computer program. The computer program when executed by a processor implements the method in any foregoing embodiments.

In an embodiment, a computer program product is further provided. The computer program product includes a computer program. The computer program when executed by a processor implements the method in any foregoing embodiments.

User information (including but not limited to user device information, user personal information, etc.) and data (including but not limited to data for analysis, storage, displaying, etc.) involved herein are authorized by fully authorized by the user or all related parties. In addition, collection, utilization, and processing of any relevant data shall comply with relevant laws, regulations, and standards of countries and/or regions that are concerned.

All or some of procedures of the method in the foregoing embodiments may be implemented through a computer program instructing relevant hardware. The computer program may be stored in a non-volatile computer-readable storage medium. The procedures of the foregoing method embodiments may be implemented when the computer program is executed. Herein any reference to a memory, a database, or another medium may indicate at least one of a non-volatile memory and a volatile memory. The non-volatile memory may include a read-only memory (ROM), a magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, and the like. The volatile memory may include a random access memory (RAM) or an external cache memory. Illustratively not restrictively, the RAM may be implemented in multiple forms, such as a static random access memory (SRAM) or a dynamic random access memory (DRAM). Any database involved herein may include at least one of a relational database and a non-relational database. The non-relational database may include but is not limited to a distributed database based on a blockchain, or the like. Any processor involved herein may include, but is not limited to, a general processor, a central processor, a graphics processor, a digital signal processor, a programmable logic device, a data processing logic device based on quantum computing, and the like.

The foregoing embodiments may be arbitrarily combined. For the sake of conciseness, not all possible combinations of the embodiments are enumerated herein. All combinations of these embodiments are regarded as being within the scope of the present disclosure, as long as there is no conflict.

Hereinabove several embodiments of the present disclosure are illustrated in detail, and these embodiments shall not be construed as a limitation to the scope of the present disclosure. Various modifications and improvements on such basis without departing from a concept of the present disclosure. These modifications and improvements fall within the protection scope of the present disclosure. Therefore, the protection scope of the present disclosure is subject to the claims.

What is claimed is:

1. A method for controlling displaying in a display panel, wherein the display panel comprises a planar region and a curved edge region, and the method comprises:

determining, for each curved region of a plurality of curved regions, a central pixel among all pixels in said curved region, wherein the curved edge region is divided into the plurality of curved regions;

determining a plurality of gray-scale combinations;

determining chromaticity coordinates of the central pixel of each curved region under each gray-scale combination of the plurality of gray-scale combinations;

determining reference chromaticity coordinates of a target pixel in the planar region under a maximum gray-scale combination among the plurality of gray-scale combinations;

determining, for each curved region, a target gray-scale combination among the plurality of gray-scale combinations based on a difference between the reference chromaticity coordinates and the chromaticity coordinates of the central pixel of said curved region under each gray-scale combination; and controlling displaying in each curved region based on the target gray-scale combination of said curved region.

2. The method according to claim 1, further comprising:

dividing the curved edge region into the plurality of curved regions through a plurality of planes that are parallel, wherein each curved region is located between two adjacent planes among the plurality of planes.

3. The method according to claim 2, wherein each plane of the plurality of planes is perpendicular to the planar region, and is parallel with a junction line between the planar region and the curved edge region.

4. The method according to claim 1, wherein each pixel in each curved region is a complete pixel.

5. The method according to claim 1, wherein a quantity of pixels in each curved region is identical.

6. The method according to claim 1, wherein determining the plurality of gray-scale combinations comprises:

determining a gray-scale range in each of pixel channels; and combining respective gray scales of all pixel channels according to the gray-scale range in each of the pixel channels to obtain the plurality of gray-scale combinations.

7. The method according to claim 1, wherein the target pixel is located on a central axis of the planar region, and the central axis is parallel with a junction line between the planar region and the curved edge region.

8. The method according to claim 7, wherein the central pixel of each curved region located in a dividing plane, and the dividing plane is perpendicular to the central axis and passes the target pixel.

9. The method according to claim 1, wherein determining, for each curved region, the target gray-scale combination among the plurality of gray-scale combinations based on the difference between the reference chromaticity coordinates and the chromaticity coordinates of the central pixel of said curved region under each gray-scale combination comprises:

for each curved region, calculating a just noticeable color difference (JNCD) for each gray-scale combination based on the difference between the reference chromaticity coordinates and the chromaticity coordinates of the central pixel of said curved region under said gray-scale combination;

determining a minimum JNCD based on the JNCD for each gray-scale combination; and determining a gray-scale combination corresponding to the minimum JNCD among the plurality of gray-scale combinations to serve as the target gray-scale combination.

10. The method according to claim 1, wherein determining the chromaticity coordinates of the central pixel of each curved region under each gray-scale combination comprises:

for each curved region under each gray-scale combination, calculating initial chromaticity coordinates of the central pixel of said curved region in an initial color space based on chromaticity coordinates and brightness of each of pixel channels under said gray-scale combination; and transforming the initial chromaticity coordinates of the central pixel of said curved region into target chromaticity coordinates of the central pixel of said curved region in a target color space, wherein the target chromaticity coordinates of the central pixel of said curved region serve as the chromaticity coordinates of the central pixel of said curved region under said gray-scale combination.

11. The method according to claim 1, wherein determining the reference chromaticity coordinates of the target pixel in the planar region under the maximum gray-scale combination among the plurality of gray-scale combinations comprises:

calculating initial chromaticity coordinates of the target pixel in the initial color space based on chromaticity coordinates and brightness of each of pixel channels under the maximum gray-scale combination; and transforming the initial chromaticity coordinates of the target pixel into target chromaticity coordinates of the target pixel in the target color space, wherein the target chromaticity coordinates of the target pixel serve as the reference chromaticity coordinates.

12. A computer device, comprising:

a memory, storing a computer program; and a processor, wherein the computer program when executed by the pressor implements the method according to claim 1.

13. A non-transitory computer-readable storage medium, storing a computer program, wherein the computer program when executed by a pressor implements the method according to claim 1.

14. An apparatus for controlling displaying in a display panel, comprising:

a first determining device, configured to determine, for each curved region of a plurality of curved regions, a central pixel among all pixels in said curved region, wherein the curved edge region is divided into the plurality of curved regions;

a second determining device, configured to:

determine a plurality of gray-scale combinations, determine chromaticity coordinates of the central pixel of each curved region under each gray-scale combination of the plurality of gray-scale combinations, and determine reference chromaticity coordinates of a target pixel in the planar region under a maximum gray-scale combination among the plurality of gray-scale combinations;

a third determining device, configured to determine, for each curved region, a target gray-scale combination among the plurality of gray-scale combinations based on a difference between the reference chromaticity coordinates and the chromaticity coordinates of the central pixel of said curved region under each gray-scale combination; and a displaying device, configured to control displaying in each curved region based on the target gray-scale combination of said curved region.

* * * * *